United States Patent

Tsao et al.

[11] Patent Number: 5,860,741
[45] Date of Patent: Jan. 19, 1999

[54] ABSOLUTE RADIATION THERMOMETER

[75] Inventors: Simon Tsao; Jin-Shown Shie; James Huang; Clark Liang; San-Bao Lin; Mang Ou-Yang; Jerry You, all of Hsin-Chu, Taiwan

[73] Assignees: Oriental System Technology, Inc.; Opto Tech Corporation; Metrodyne Co., Ltd., all of, Taiwan

[21] Appl. No.: 738,646

[22] Filed: Oct. 30, 1996

Related U.S. Application Data

[60] Provisional application No. 60/014,069 Mar. 25, 1996.
[51] Int. Cl.[6] ............................... G01J 5/08; G01J 5/06; G01J 6/62
[52] U.S. Cl. ............................... 374/129; 374/130; 374/133
[58] Field of Search ................................. 374/133, 130, 374/129; 250/338.3

[56] References Cited

U.S. PATENT DOCUMENTS

| | | | |
|---|---|---|---|
| 3,453,432 | 7/1969 | McHenry et al. | 364/133 |
| 3,877,308 | 4/1975 | Taylor | 374/133 |
| 4,441,023 | 4/1984 | Doctor et al. | 250/338 |
| 4,797,840 | 1/1989 | Fraden | 364/557 |
| 5,127,742 | 7/1992 | Fraden | 374/129 |
| 5,165,796 | 11/1992 | Gat et al. | 374/129 |
| 5,567,052 | 10/1996 | Yoshiike et al. | 374/130 |

FOREIGN PATENT DOCUMENTS 07311085  11/1995  Japan .

Primary Examiner—Diego F. F. Gutierrez
Attorney, Agent, or Firm—Pillsbury Madison & Sutro LLP

[57] ABSTRACT

An absolute radiation thermometer capable of evaluating the absolute value of infrared radiation power emitted from a target and received by a radiation sensor by means of electrical calibration, and calculating the temperature of the target basing on the responsive signal generated in the radiation sensor. To solve "Microphonic" problem, two identical sensors connected in parallel with the polarized orientations of their pyroelectric layers being in opposite directions so as to cancel the piezoelectric signals generated in the two sensors are used. Further, by using a floating power supply, which is isolated from the system power supply of the thermometer, for performing electrical heating, power supply noise can be greatly reduced.

3 Claims, 14 Drawing Sheets

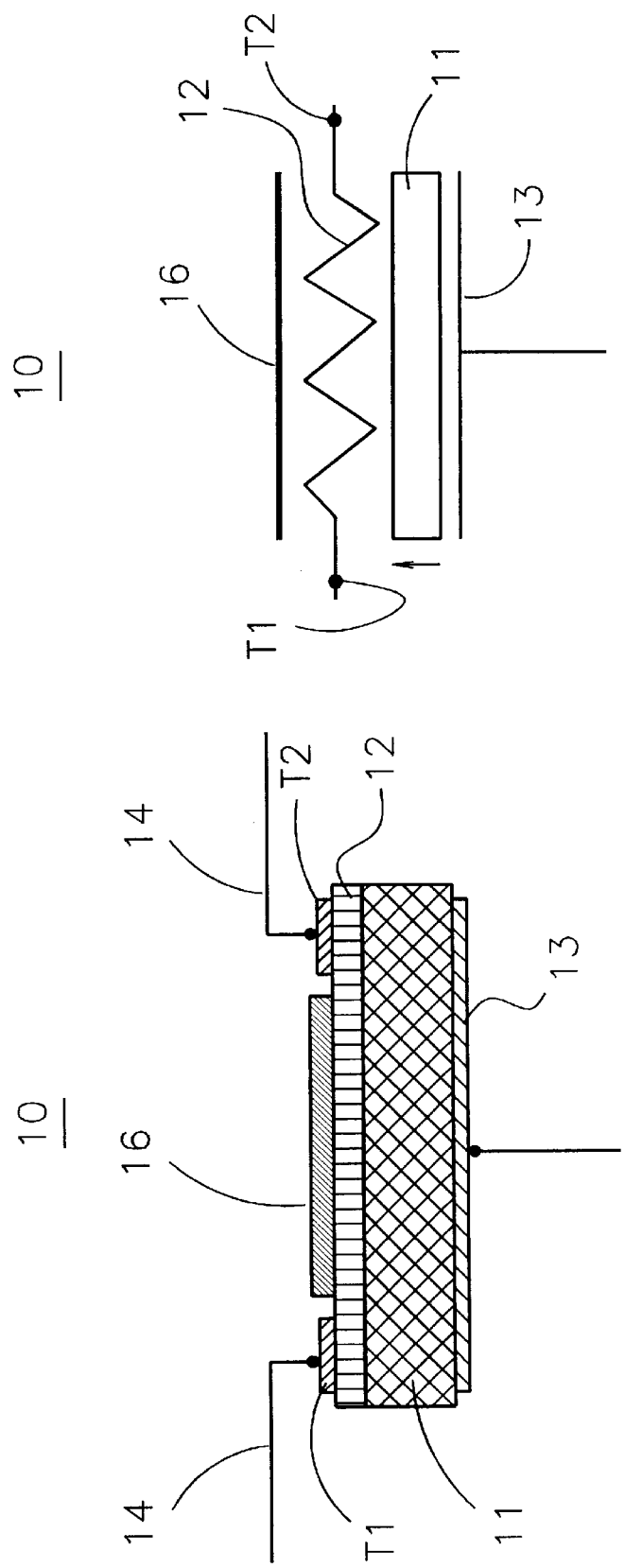

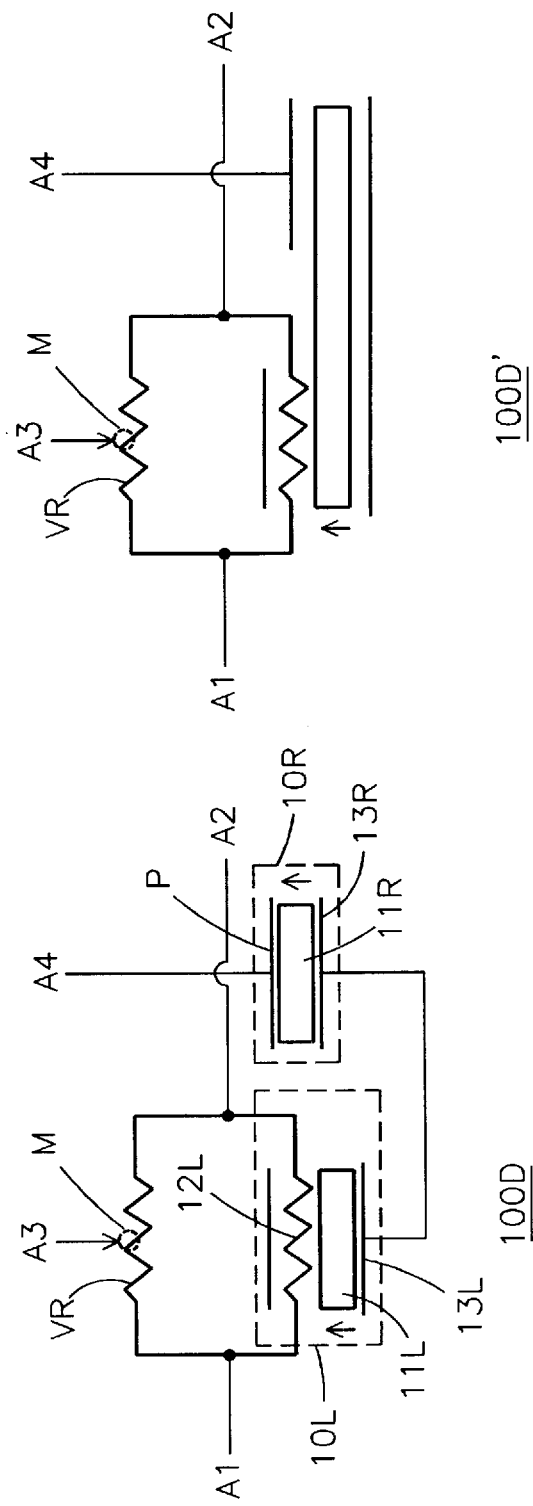

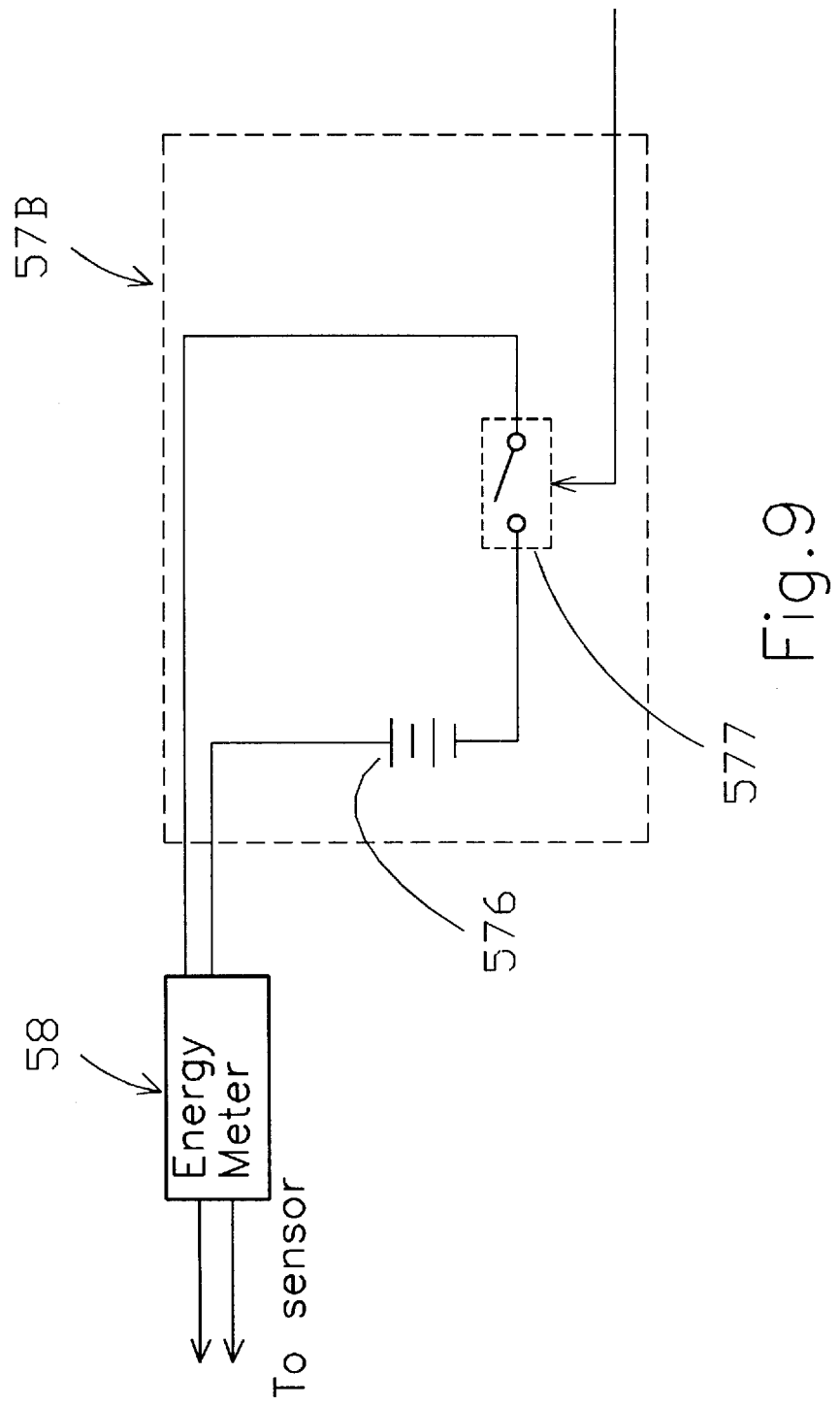

ABSOLUTE RADIATION THERMOMETER

BACKGROUND OF THE INVENTION

This application is a provisional Ser. No. 60/014,069 filed Mar. 25, 1996.

FIELD OF THE INVENTION

This invention relates to an absolute radiation thermometer capable of evaluating the absolute value of infrared radiation power emitted from a target and received by a radiation sensor (or a sensing element) by means of electrical calibration, and calculating the temperature of the target basing on the responsive signal generated in the radiation sensor (or the sensing element).

Temperature measurement with respect to an object has been a common and important technique in the fields of science and industry for a long time. The methods for measuring temperature can be classified into two categories—contact-type and noncontact-type. In the case of the former type, heat is transmitted to temperature measuring instrument through a contact interface by means of physical contact between a sensing element and a target of which the temperature is to be detected so as to obtain a responsive signal. On the other hand, in the case of the latter type, a substantial distance exists between the temperature measuring instrument and the target, and heat radiation therebetween is used as the heat transfer mechanism.

The method of temperature measurement by use of heat radiation possesses many advantages. First, the result of temperature measurement is more accurate as compared with the contact-type since influence of the temperature sensing element on the target is smaller, particularly, in the case when the heat capacity of the target is relatively small. Besides, possible troubles, danger and impracticability of "contact", in cases of, for example, measurement of a patient's temperature in medical treatment, measurement of the surface temperature of a large electricity utility installed at a high place, and temperature monitoring operation for preventing a fire etc. can be avoided. Consequently, hitherto noncontact-type is the most desirable way for temperature measurement.

One example of noncontact-type temperature measurement is the pyroelectric radiometer which mainly bases on the principle of the so-called "pyroelectric effect". Namely, a pyroelectric radiometer including a pyroelectric sensing element partly made of pyroelectric material is used. When temperature difference exists between a target of which the temperature is to be detected and a pyroelectric sensing element of a pyroelectric radiometer, heat exchange by radiation between the target and the pyroelectric sensing element will occur. The pyroelectric sensing element will be optically heated by the infrared radiation emitted from the target, and thus its temperature will be changed. Due to the feature of the pyroelectric material, a transient charge will be induced on the pyroelectric sensing element by the temperature change. Further, a response current can be resulted by connecting an outer electric circuit to the pyroelectric sensing element.

TECHNICAL BACKGROUND

FIG. 1 is a block diagram illustrating an example of prior electrically calibrated pyroelectric radiometers. FIG. 2A is a sectional view showing the detailed construction of a sensing element 10 adopted in the radiometer of FIG. 1, and FIG. 2B is the equivalent circuit diagram of the sensing element 10 illustrated in FIG. 2A. As shown in FIGS. 2A and 2B, the sensing element 10 mainly comprises a pyroelectric layer 11 which will generate a transient responsive charge when heated and raised in its temperature; an electrical resistance layer 12 provided on the one side of the pyroelectric layer 11; a first heating terminal T1 and a second heating terminal T2 which are provided, respectively, on the two ends of the electrical resistance layer 12 and are connected to an outside power supply (not shown in FIG. 2A) through lead wires 14 for heating said electrical resistance layer 12; a bottom electrode 13 which is provided on the other side of the pyroelectric layer 11 and is connected to an outer electric circuit (not shown in FIG. 2A) through lead wire 15 so that electrical current induced in said pyroelectric layer 11 may be conducted to the outer electric circuit; and a black coating layer 16 attached to the side of electrical resistance layer 12 opposite to the pyroelectric layer 11 for receiving infrared radiation coming from the target and conducting heat to the pyroelectric layer 11. When the pyroelectric layer generates current upon being heated, the electrode 13 has a plus (minus) polarity if it sources (sinks) the generated current. The same definition for the polarity of electrode is applicable throughout this specification.

The construction of the above prior electrically calibrated pyroelectric radiometer will now be illustrated with reference to FIG. 1. This radiometer mainly comprises the afore-described sensing element 10 which can alternatively be electrically-heated by outer electrical power supply or be optically-heated by infrared radiation from a target 1 (a radiation source), whereby producing a response current (responsive signal) in an outer electric circuit connected thereto, a chopper 2 which is interposed between the target 1 and the sensing element 10 and which is continuously rotated so as to allow infrared radiated from the target 1 to pass the chopper 2 intermittently for being received by the sensing element 10, a pre-amplifier 3 connected to the sensing element 10 by lead wire 15 so as to condition the responsive signal produced by the sensing element 10, a motor 24 for rotating the chopper 2, a driving circuit 25 for driving the motor 24, an energy meter 4 for measuring the electrical power supplied to the sensing element 10, an isolation amplifier 5 for supplying electrical power to the sensing element 10, an A/D converter 20, an analog multiplexer 9 for optionally feeding a signal coming from the pre-amplifier 3 or the energy meter 4 into the A/D converter 20, a D/A converter 6, a microprocessor 21 for supplying controlling signals, respectively, to the driving circuit 25, the A/D converter 20, the analog multiplexer 9, and the D/A converter 6 and for processing those data coming from the analog multiplexer 9 and then converted into digital signals by the A/D converter 20, a storage unit 22 connected to the microprocessor 21 so that the latter may access its data, a display 23 connected to the microprocessor 21 for displaying data supplied by the latter, and a starting button 26 for starting the microprocessor 21. An electrically heating signal produced by the microprocessor 21 is first converted into analog signal by the D/A converter 6 and then amplified by the isolation amplifier 5 before being supplied to the heating terminal of the sensing element 10.

Now, the way how the above-described prior electrically calibrated pyroelectric radiometer acts will be illustrated below. Infrared radiated from the target 1 is chopped by the chopper 2. Chopped radiation power is supplied to (the black coating layer 16 of) the sensing element 10 when the chopper 2 opens so as to produce a pyroelectric responsive signal. This signal is first conditioned by the pre-amplifier 3, then supplied to the A/D converter 20 through the analog multiplexer 9 for being A/D converted, and finally processed by the microprocessor 21. When the chopper 2 closes, a tried electrical power is delivered to the sensing element 10 for electrically heating its electrical resistance layer 12 so as to generate an pyroelectric responsive signal in its pyroelectric layer 11. These two signals are compared. When equalization is reached (namely when their difference is within an allowable range), the radiation power from the target 1 can be obtained from the known electrical heating power. Usually, several trials by alternately applying electrical heating and optical heating to the sensing element 10 must be made to reach the state of equalization, Such a procedure is called "auto-nulling".

As explained above, the prior electrically calibrated pyroelectric radiometer as shown in FIG. 1 has the following drawbacks:

(1). Its construction is complicated and bulky due to the necessity of a continuously rotating chopper;

(2). Its electrical power consumption is large due to the need of repeated electrical heating during auto-nulling;

(3). It takes much time to detect the radiation power from the target 1 due to the need of repeated electrical and optical heating, and is thus not suitable for being commercialized; and (4). Due to the capacitive coupling between the electrical resistance layer 12 and the bottom electrode 13 of the sensor (see FIG. 2B), the high frequency component of heating voltage will couple into the pre-amplifier. Such a capacitive coupling signal is not a real pyroelectric responsive signal due to heating, and thus is a "false signal" which will cause inaccuracy of the measuring result. In the prior electrically calibrated pyroelectric radiometer, the problem of "false signal" is solved by use of a expensive isolation amplifier 5 which inevitably increases its manufacturing cost.

Besides, a prior pyroelectric radiation thermometer entitled "INFRARED ELECTRONIC THERMOMETER AND METHOD FOR MEASURING TEMPERATURE" is disclosed in U.S. Pat. No. 4,797,840. In this patent, pyroelectric responsive signal is calibrated by means of "piezo effect" so as to compensate possible variations in pyroelectric responsive signal due to material aging, temperature drifts, or instability of electronic components, etc. The calibration method and calibration circuit 30 adopted in this patent will now be described with reference to FIGS. 3 and 4. As shown in FIG. 3, in the calibration circuit 30 is adopted a pyroelectric sensing element 31 comprising a pyroelectric film 35 and an outer planar electrode 96 which is provided on the outwardly facing surface of the film 35 and is composed of two separate spaced electrode segments 33, 34. The calibration circuit 30 further comprises an amplifier circuit 37, a microprocessor 38, a switch 36 and an excitation circuit 39. In FIG. 3, numeral 42 denotes a wave guide having the shape of a hollow tube for directing infrared radiation from the target to the pyroelectric sensing element 31. Numeral 43 denotes a shutter for controlling the passage of infrared radiation through the wave guide 42 so as to allow the infrared radiation to reach the pyroelectric sensing element 31 only during predetermined period. The electrode segment 34 is connected to amplifier circuit 37. The electrode segment 33 is connected to switch 36 which alternately interconnects the electrode segment 33 to either the amplifier circuit 37 or to the excitation circuit 39. The excitation circuit 39 can be used to produce a predetermined electrical calibration signal 40 adapted to excite the pyroelectric film 35 to produce a mechanic stress and, in turn, a responsive electrical signal 41 (see FIG. 4). The value of the responsive electrical signal 41 at the time of assembly, namely at the time when aging of the pyroelectric sensing element 31 has not yet begun, will constitute a predetermined standard and is stored in memory. The switch 36 and the excitation circuit 39 are controlled by the microprocessor 38 and, upon command from the microprocessor 38 during calibration operation, the excitation circuit 39 generates a predetermined electrical calibration signal 40.

Next, the calibration operation of the above U.S. Pat. No. 4,797,840 will be described. Immediately before temperature measurement of the target and in a state wherein the shutter 43 is closed, the switch 36 interconnects the electrode segment 33 to the excitation circuit 39 and the predetermined electrical signal 40 is supplied to the electrode segment 33. Due to the piezoelectric properties of the pyroelectric film 35, this causes a mechanical stress and, in turn, the mechanical stress causes the pyroelectric film 35 to generate a responsive electrical signal 41 in electrode 32 which is conducted to the amplifier circuit 37 via the electrode segment 34. Since the mechanical stress calibration signal is a predetermined value, deviation in the responsive signal 41 is indicative of changes in the pyroelectric sensing element 31 and the degree of deviation from the predetermined standard provides the necessary calibration information for appropriate correction by the microprocessor 38. Immediately following the calibration operation, the switch 36 interconnects the electrode segment 33 to the amplifier circuit 37 so as to begin temperature measuring operation of the target. The shutter 43 is opened so as to allow infrared radiation from the target 1, under the guidance of the wave guide 42, to reach and, thus, to optically heat the pyroelectric sensing element 31. Assume that the measured value of the responsive power signal in the pyroelectric sensing element 31 with respect to the optical heating is Vt', correct value for the responsive power Vt can be calculated after correcting the value Vt' by use of those calibration information obtained during the above calibration operation so as to compensate variations due to material aging of pyroelectric sensing elements, etc. Subsequently, temperature of the target 1 can be calculated according to the formula listed below:

$$Vt=f(Ta)\times(Tt^4-Ta^4)$$

wherein, Ta is the absolute ambient temperature, Tt is the absolute temperature of the target, and f(Ta) is a function of ambient temperature Ta.

The above calibration operation bases on an assumption that the effect of aging of the pyroelectric sensing element upon its pyroelectric responsivity is completely identical to the effect upon its piezoelectric coefficient. However, since pyroelectric responsivity may be affected by various parameters (such as piezoelectric coefficient of the pyroelectric sensing element, thermal time constant of the pyroelectric sensing element, and thermal conductance between the pyroelectric sensing element and its environment etc.), not just by the piezoelectric coefficient, the above assumption is not true. Consequently, accurate temperature measurement cannot be expected by use of such a pyroelectric radiation thermometer despite of the above calibration operation. Besides, during calibration operation, since the original structure of anti-microphonic sensor is no more connected in series, the original anti-microphonic mechanism fails which makes the noise of calibrated measurement result increase.

In addition, U.S. Pat. No. 4,797,840 also discloses a heating element temperature-controlled to a constant temperature which is used as a reference for obtaining the temperature of a target. A shutter is optionally opened or closed so as to allow a pyroelectric sensor to optionally receive infrared radiation from the target and thus generate a first responsive signal, or to receive infrared radiation from the heating element and thus generate a second responsive signal. the temperature of the target is then calculated from the measured first and second responsive signals and from the temperature of the heating element which is kept constant and is known. Temperature measurement by this way has some drawbacks. Namely, the heating element must be heated continuously so as to control its temperature to a constant, which requires a considerable electrical power, which makes the cost of utilizing such a thermometer increase. Also, it is difficult to makes such a thermometer compact. Besides, since it is time-consuming for the heating element to reach a stably constant temperature upon use, such a thermometer is not suitable for being commercialized. Further, due to the fact that the target temperature is calculated by use of the responsive signals of the pyroelectric sensor rather than the absolute value of infrared radiation coming directly from the target, such a thermometer is not an absolute radiation thermometer.

In U.S. Pat. No. 4,790,324 and U.S. Pat. No. 4,602,642, black bodies temperature-controlled at constant temperatures are used for calibrating the thermometer. Hence, thermometers according to these two Patents suffer from substantially the same drawbacks as in the case of heating element in U.S. Pat. No. 4,797,840.

In U.S. Pat. No. 4,900,162 is disclosed a thermometer comprising a radiation detector and a heating and cooling unit for heating and cooling the radiation detector so as to keep the temperature of the latter at constant. When the value of a null radiometer signal, proportional to the difference between a radiation detector temperature and a target temperature, is zero, the temperature difference between the radiation detector and the target is judged to be zero, and the target temperature can be obtained from the known radiation detector temperature. Since the heating and cooling operation is both power-consuming and time-consuming, this thermometer also suffers from the drawbacks of high cost and difficulty in miniaturizing and commercializing.

In U.S. Pat. No. 4,907,895 is disclosed an optical chopper for infrared thermometer, which is rotated by a motor. Since considerable electrical power is required for driving the motor, this design also has the same disadvantages as those power-consuming thermometers described above. In addition, since no calibration is made in this design, long term stability can be obtained only by use of expensive components which will increase its manufacturing cost. In the "infrared medical thermometer" disclosed in U.S. Pat. No. 4,993,424, a reference plate pivoted in front of a probe for calibration is used. The reference plate also must be heated to keep its temperature at a constant value, which is both power-consuming and time-consuming. Thus, this thermometer also suffers from the drawbacks of high cost and difficulty in miniaturizing and commercializing.

In the temperature measuring apparatus disclosed in U.S. Pat. No. 5,127,742, a shutter controlled at a constant temperature is used for providing a thermometer which can measured independent of ambient temperature, and which can enlarge the operable range of temperature measurement. In addition to the afore-mentioned drawbacks occurring in temperature control operation, another problem of this temperature measuring apparatus resides in the difficulty in connecting wires for heating to a shutter moving at high speed.

SUMMARY OF THE INVENTION

In view of the afore-mentioned drawbacks of prior art, the primary object of this invention is to provide an absolute radiation thermometer and a temperature measuring method using it, by which infrared radiation coming from a target and received by a pyroelectric sensor is first calculated from known power for electrical heating applied to same sensor, and then the target temperature is further calculated directly from the obtained infrared radiation so as to avoid influence on the accuracy in measurement of infrared radiation from the target and thus of the target temperature by the responsivity of pyroelectric sensing elements constituting the pyroelectric sensor.

Another object of this invention is to provide a compact, portable, simple-structured, and low cost radiation thermometer which requires much fewer electricity consumption as compared with prior radiation thermometer.

Yet another object of this invention is to provide a radiation thermometer in which optical heating by infrared radiation from a target and electrical heating by a controlled power supply are applied to the same component so as to obtain a more accurate result in the measured infrared radiation and thus in the obtained target temperature.

Yet another object of this invention is to provide a radiation thermometer which has longer working life, and which has good long-term stability without the necessity of further calibration after sale.

Yet another object of this invention is to provide a radiation thermometer which is very suitable for commercializing since temperature measurement can be finished within about only one second.

Yet another object of this invention is to provide a radiation thermometer by which the problem of "false signal" existing in prior pyroelectric radiometer, as described above, can be solved without using expensive and complicated device, thus its manufacturing cost can be reduced.

Yet another object of this invention is to provide a radiation thermometer in which power supply noise can be greatly reduced by using a floating power supply, which is isolated from the system power supply of the thermometer, for performing electrical heating.

An absolute radiation thermometer in accordance with this invention comprises:

a sensor for generating a first responsive signal in response to electrical power supplied thereto by an outside power supply, or generating a second responsive signal in response to infrared radiation coming from a target of which the temperature is to be measured;

a chopper which is interposed between the target and the sensor and which can be controlled to open or close the passage of infrared radiation from the target toward the sensor as to allow the infrared radiation to be received by the sensor only during predetermined period;

an energy stimulator for supplying electrical power to the sensor; and signal processing and calculating means for processing the first responsive signal and the second responsive signal generated by the sensor, calculating the power of infrared radiation coming from the target and received by the sensor, and then obtaining the temperature of the target according to the power of infrared radiation.

A temperature measuring method by using an absolute radiation thermometer in accordance with this invention mainly comprises the following steps:

(1) Taking the ambient temperature Ta;

(2) Supplying an electrical power to the sensor from the energy stimulator for generating a first responsive signal Ve in response to the supplied electrical power;

(3) Measuring the electrical power supplied to the sensor, and recording the supplied electrical power as a reference electrical power Ee;

(4) Opening the chopper to allow the sensor to receive infrared radiation coming from the target for generating a second responsive signal in response to the received infrared radiation, and then closing the chopper;

(5) Calculating the temperature Tt of the target by use of the signal processing and calculating means according the below formula:

$$Tt=((Ee*Vt/Ve)/Kb+Ta^4)^{1/4}$$

where, Kb is a constant which can be precisely determined, when manufacturing, by a black body with a known Tt.

BRIEF DESCRIPTION OF THE DRAWINGS

The detailed structure, features and characteristics of this invention will be described more clearly with the descriptions of the preferred embodiments in conjunction with the accompanying drawings, in which:

FIG. 2A is a sectional view showing the detailed construction of a pyroelectric sensing element adopted in the prior radiometer of FIG. 1 and also in the absolute radiation thermometer of this invention;

FIG. 2B is the equivalent circuit diagram of the pyroelectric sensing element shown in FIG. 2A;

FIG. 7A is a schematic diagram of the second type of anti-microphonic sensor according to this invention, which is slightly different from the sensor shown in FIG. 6C;

FIG. 7B is a variation of the sensor showing in FIG. 7A;

FIG. 9 is a schematic diagram showing the construction of another type of energy stimulator adopted in this invention;

DETAILED DESCRIPTION OF THE PREFERRED EMBODIMENTS

Figure 5A:
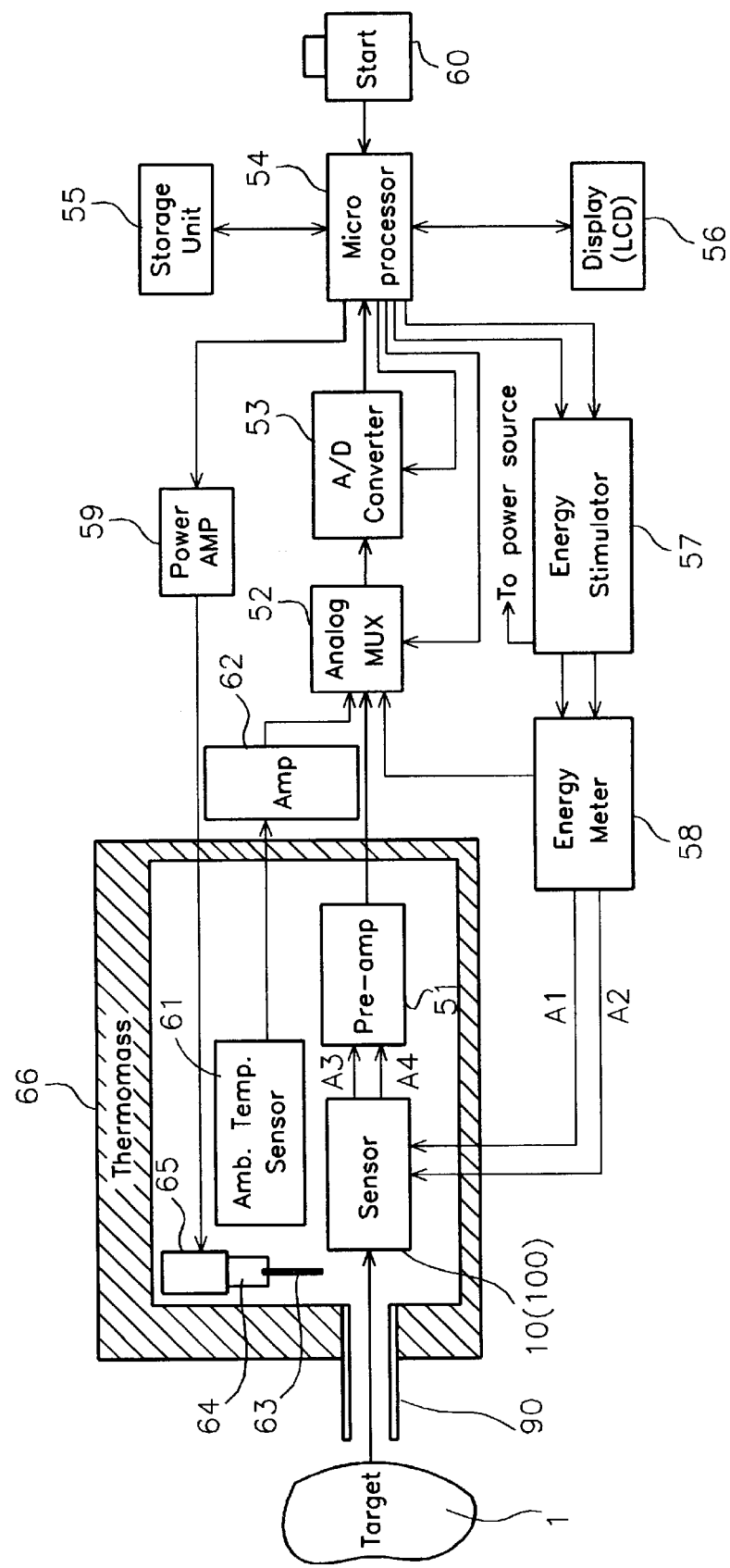
FIG. 5A is a block diagram schematically showing the structure of an absolute radiation thermometer in accordance with an embodiment of this invention.
Figure 5B:
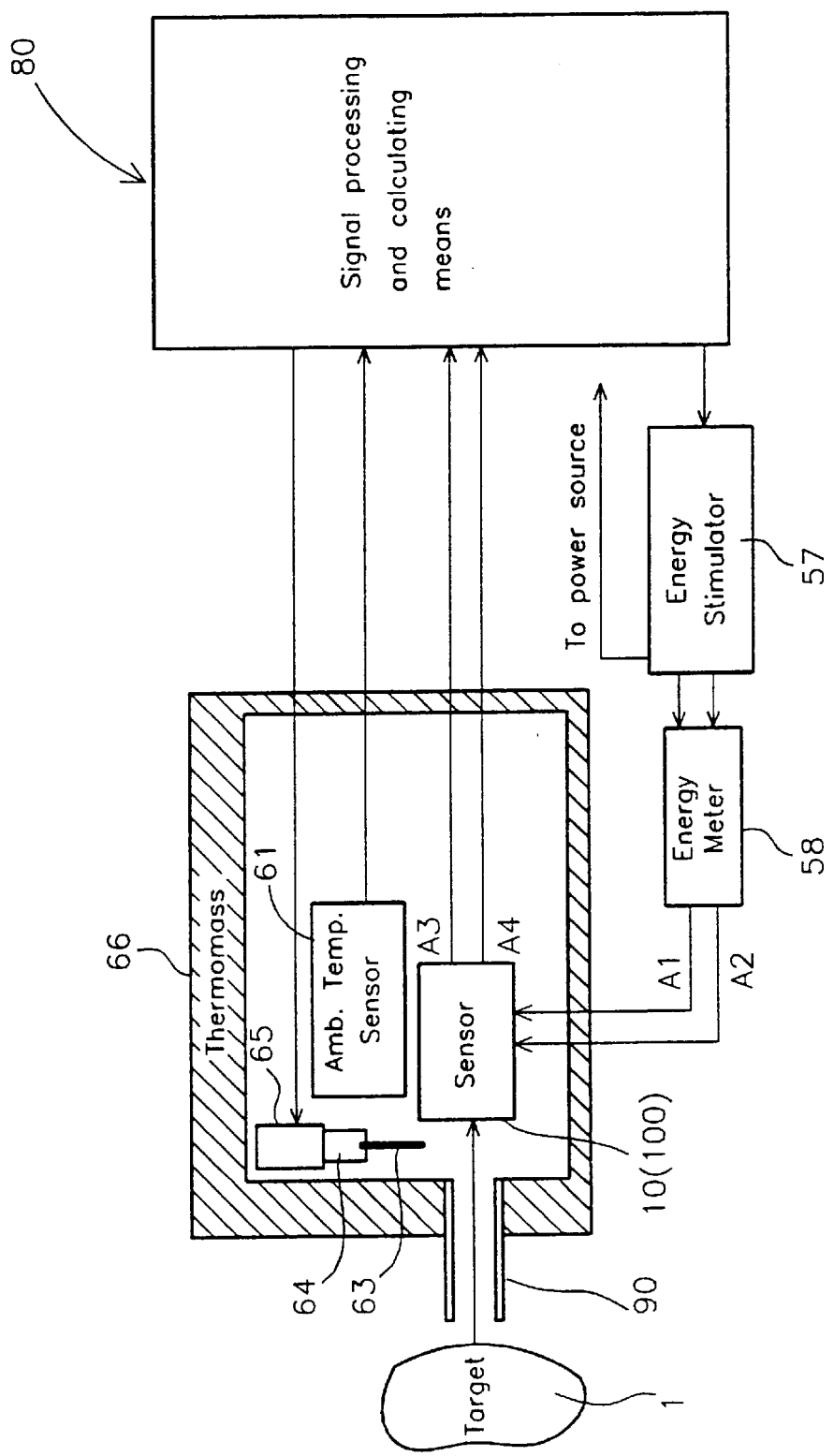
FIG. 5B is a simplified block diagram of FIG. 5A.

The absolute radiation thermometer according this invention will now be described in detail by referring to FIG. 5A. As shown in FIG. 5A, the absolute radiation thermometer comprises: a pyroelectric sensing element 10 having the same construction as that illustrated in FIGS. 2A and 2B which will generate a response current in a circuit connected thereto when being electrically heated by outer electrical power supply or being optically heated by a target (an infrared radiation source), a chopper 63 which is interposed between the sensing element 10 and a target 1 of which the temperature is to be measured, and which can be controlled to open or close the passage of infrared from the target 1 toward the sensing element 10 so as to allow infrared coming from the target 1 to pass therethrough and to be received by the sensing element 10 only during predetermined "open" period, a hollow tubular wave guide 90 for guiding infrared from the target 1 toward the sensing element 10, a pre-amplifier 51 connected to the sensing element 10 so as to condition the response current produced by the sensing element 10, a chopper driving mechanism 64 for moving the chopper 63 upwards or downwards so as to open or close the passage of infrared, a chopper driving circuit 65 for driving the chopper driving mechanism 64, an ambient temperature sensor 61 for measuring the ambient temperature, a temperature signal amplifier 62 for amplifying the ambient temperature signal, an energy meter 58 for measuring the electrical power supplied to the sensing element 10, an energy stimulator 57 for supplying electrical energy to the sensing element 10, an A/D converter 53, an analog multiplexer 52 for optionally feeding a signal coming from the temperature signal amplifier 62, the pre-amplifier 51 or the energy meter 58 into the A/D converter 53, a microprocessor 54, a storage unit 55 connected to the microprocessor 54 so that the latter may access its data, a display 56 connected to the microprocessor 54 for displaying data supplied by the latter, and a starting button 60 for starting the microprocessor 54. The microprocessor 54 is used for supplying controlling signals, respectively, to the A/D converter 53, the analog multiplexer 52, the stimulator 57 or to the chopper driving circuit 65 through a power amplifier 59, and for processing those data coming from the analog multiplexer 52 and then converted into digital signals by the A/D converter 53. In addition, the sensing element 10 and the ambient temperature sensor 61 are received in a thermomass 66 (a container with rather large heat capacity) which greatly reduce the influence of ambient temperature fluctuation on the pyroelectric coefficient of the pyroelectric sensing element 10. To facilitate subsequent description, FIG. 5A. may be transformed into a simplified block diagram as shown in FIG. 5B wherein those components having little relation with the characteristics of this invention have been put into a block 80 referred to as the "signal processing and calculating means".

Figure 6B:
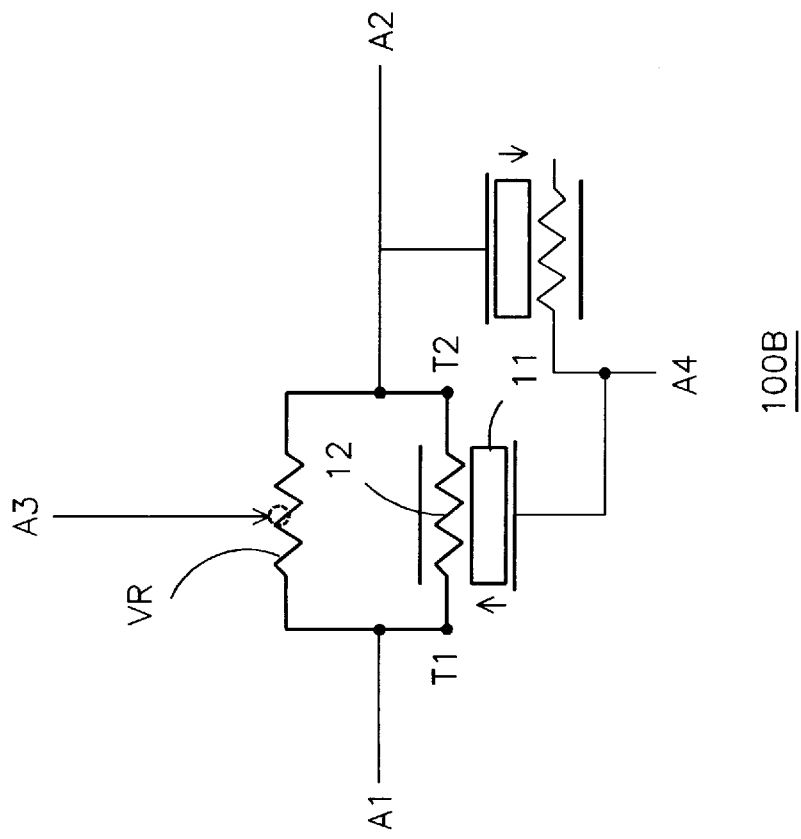
FIG. 6B is a schematic diagram of the first type of anti-microphonic sensor according to this invention obtained by modifying the sensor shown in FIG. 6A.
Figure 6A:
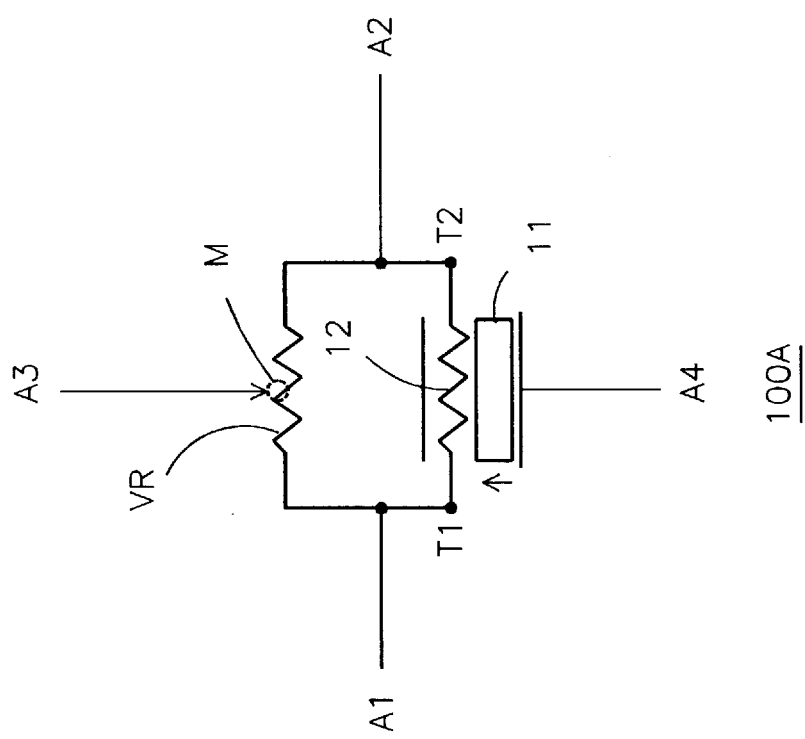
FIG. 6A is a schematic diagram of a sensor wherein the signal readout electrode and the heating terminals are separated.

Next, further improvements with respect to the pyroelectric sensing element 10 will be described below. In the sensing element 10 as shown in FIG. 2B, if the electrical resistance layer 12 and the bottom electrode 13 are used as readout electrodes for reading out the responsive pyroelectric signals generated by the pyroelectric layer 11, the electrical signal for heating the electrical resistance layer is apt to be coupled to the real pyroelectric signal to be measured and thus interfere the latter, due to the capacitor property of the pyroelectric sensing element 10. Thus, as shown in FIG. 6A, a variable resistance VR is preferably connected in parallel to the electrical resistance layer 12 at the heating terminals T1, T2 provided on the two ends of layer 12, with the two connecting nodes being further connected through the lead wires A1, A2 and the energy meter 58 to the energy stimulator 57 (see FIGS. 5A and 5B). In addition, the variable resistance VR is slidably contacted by a sliding electrode M of which the contacting location must be properly adjusted so that the variable resistance VR and the electrical resistance layer 12 may constitute a balanced electrical bridge so as to avoid capacitive coupling signal in measured pyroelectric signal. The sliding electrode M, acting as a virtual readout electrode, together with the original readout electrode—the bottom electrode 13 are connected, respectively, through the lead wires A3, A4 to the pre-amplifier 51(see FIGS. 5A and 5B), so as to read out the desired pyroelectric signal, which is free from the interference of heating signal, and send this pyroelectric signal to the pre-amplifier 51. The thus formed sensor is expressed by the numeral 100A in FIG. 6A.

Figure 6C:
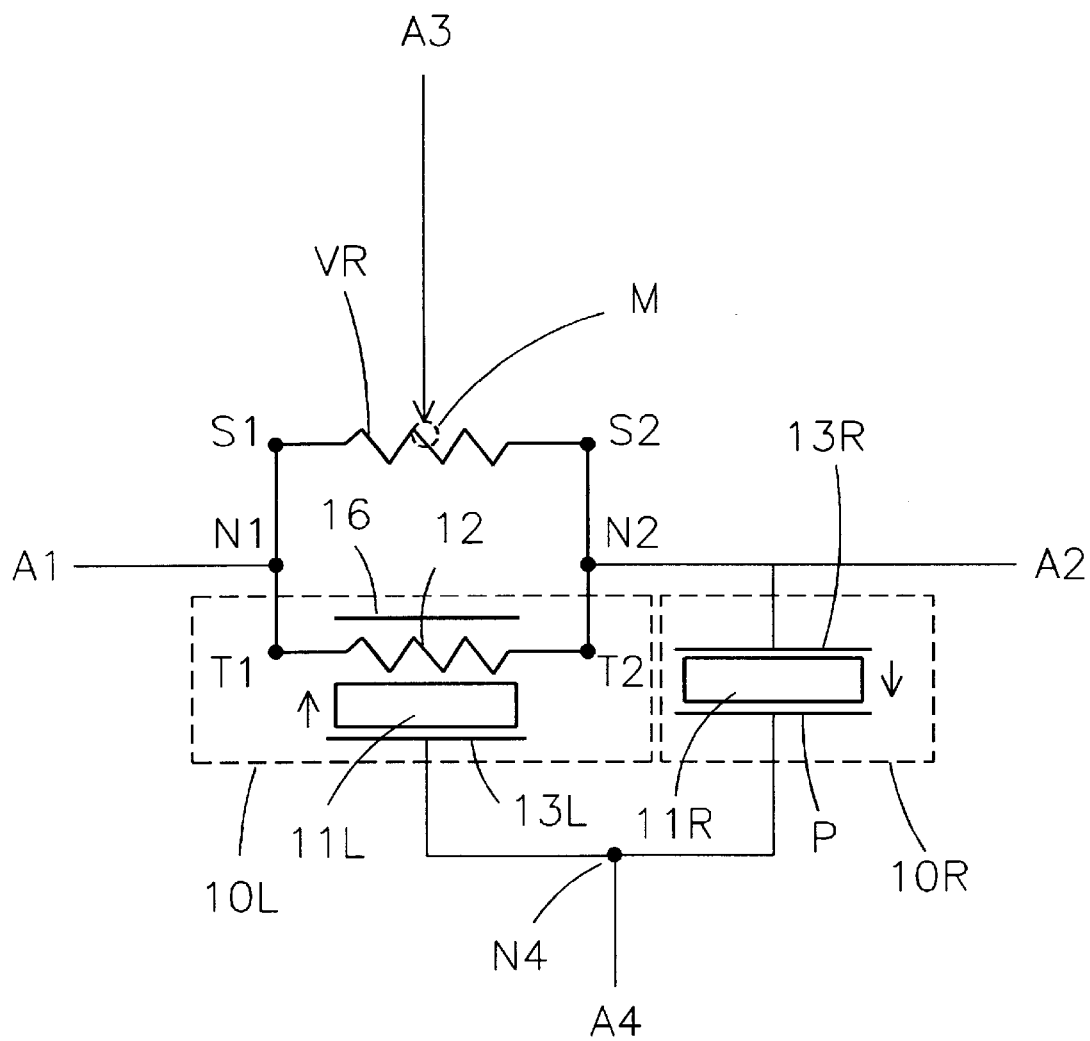
FIG. 6C is a schematic diagram of an anti-microphonic sensor obtained by simplifying the anti-microphonic sensor shown in FIG. 6B.

In the utilization of pyroelectric sensing element or pyroelectric sensor, another so called "Microphonic" problem should preferably be solved. Specifically, all pyroelectric materials have also piezoelectric properties. Consequently, a pyroelectric sensing element made of pyroelectric material, when subjected to a mechanical stress, will generate a responsive electrical signal. The pyroelectric responsivity of a pyroelectric sensing element will be affected not only by its temperature fluctuation, but also by its physical deformation caused by vibration. Thus, the generated responsive electrical signal is usually the mixture of pyroelectric signal and piezoelectric signal. In order to delete unnecessary piezoelectric signal, the sensor 100A shown in FIG. 6A can be modified into the first type of anti-microphonic sensor 100B as shown in FIG. 6B. Two identical sensors 100A are connected in parallel with the polarized orientations (shown by an arrow "↑" or "↓", respectively) of their pyroelectric layers being in opposite directions so as to cancel the piezoelectric signals generated in the two sensors. Since optical heating (by infrared radiation) and electrical heating are applied only to the sensor on the left side, the balanced bridge may be omitted in the right sensor to become a sensor 100B having the construction of FIG. 6B. Further, the electrical resistance layer and the black coating layer in the right sensor may be replaced with a top electrode P so as to obtain the sensor 100C as shown in FIG. 6C.

Specifically, the sensor 100C includes: a first pyroelectric sensing element 10L on the left side, a second pyroelectric sensing element 10R on the right side, and a variable resistor VR. The first pyroelectric sensing element 10L is used for receiving infrared radiation coming from the target or electrical power supplied by an outside power supply. The first pyroelectric sensing element 10L includes a first pyroelectric layer 11L; a first electrical resistance layer 12 provided on one side of the first pyroelectric layer; a first heating terminal T1 provided on the first end of the first electrical resistance layer 12; a second heating terminal T2 provided on the second end of the first electrical resistance layer 12; a first bottom electrode 13L provided on the other side of the first pyroelectric layer 11L; and a black coating layer 16, attached to the side of electrical resistance layer 12 opposite to the pyroelectric layer 11L for receiving infrared radiation coming from the target and conducting heat to the pyroelectric layer 11L.

The second pyroelectric sensing element 10R includes: a second pyroelectric layer 11R; a top electrode P provided on one side of the second pyroelectric layer 11R; and a second bottom electrode provided 13R on the other side of the second pyroelectric layer 11R.

The variable resistor VR includes: a second electrical resistance layer having a first end S1 and a second end S2; a sliding electrode M slidably contacting the second electrical resistance layer and capable of being moved along the second electrical resistance layer between the first end S1 and the second end S2. The sliding electrode M is adjusted to a proper location between the first and second ends so that the variable resistor VR may form a balanced bridge with the first electrical resistance layer 12, and the sliding electrode M acts as a virtual readout electrode.

Figure 8A:
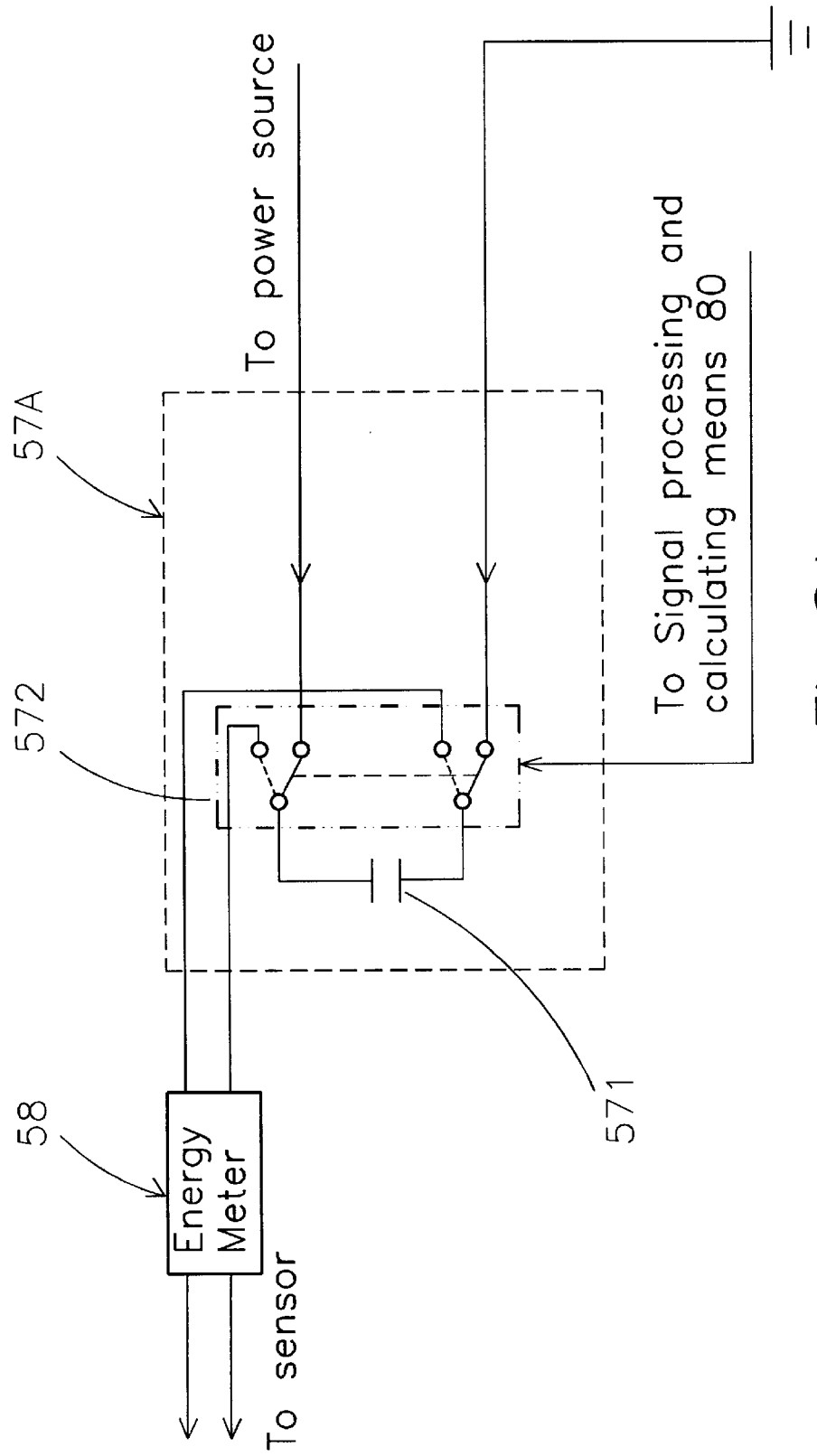
FIG. 8A is a schematic diagram showing the construction of one type of energy stimulator adopted in this invention.
Figure 8B:
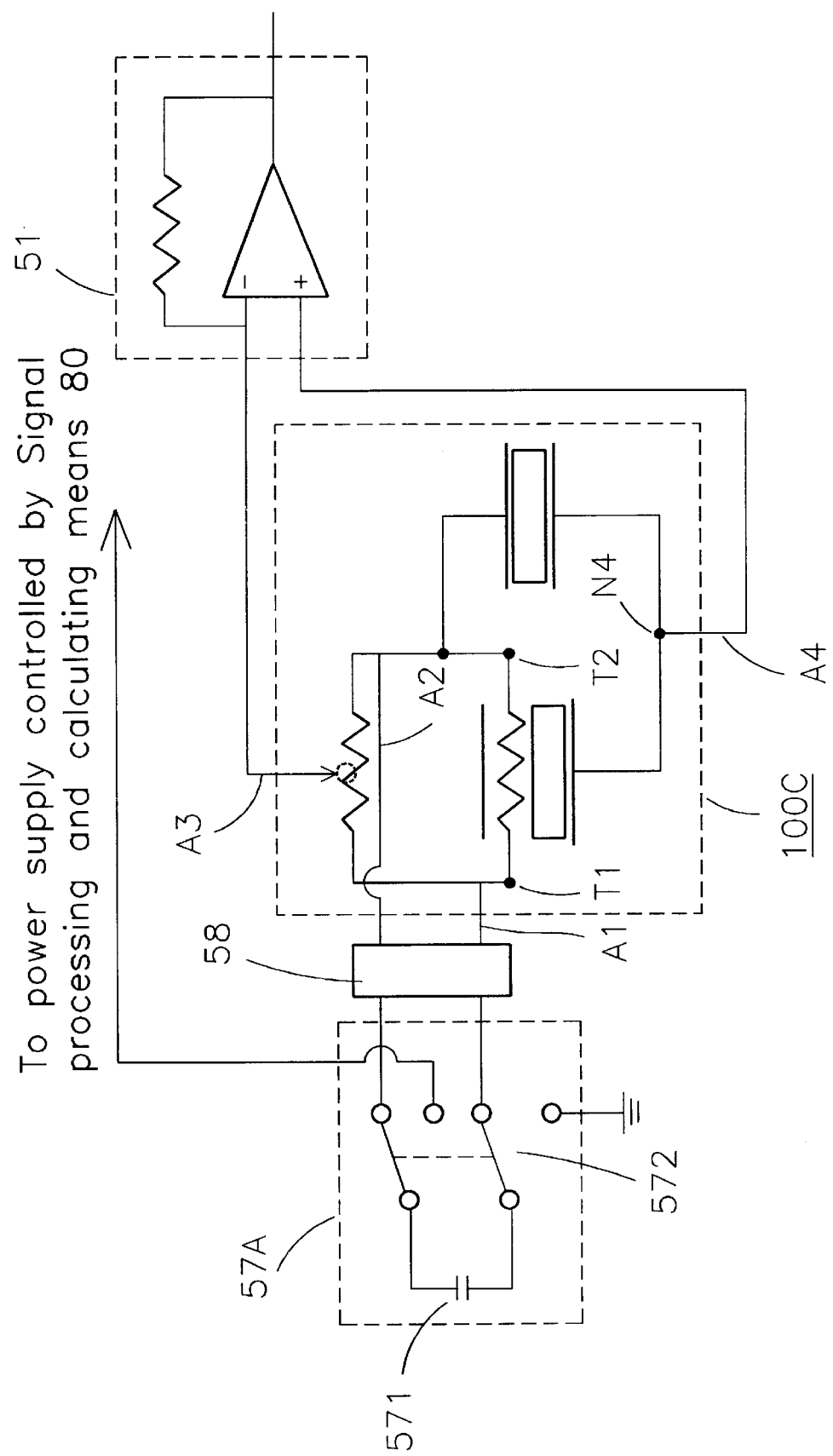
FIG. 8B is a schematic diagram showing the way of connecting the anti-microphonic sensor illustrated in FIG. 6C, the energy stimulator illustrated in FIG. 8A, and a responsive signal pre-amplifier etc.

The first end S1 and the first heating terminal T1 are connected at a first node N1, the second end S2 and the second heating terminal T2 are connected at a second node N2, and both the first node N1 and the second node N2 are connected to the energy stimulator 57 or 57A (see FIG. 5B or 8B). The top electrode P and the first bottom electrode 13L, which are connected at a fourth node, have opposite polarities. Namely, one electrode is of plus polarity and the other electrode is of minus polarity. Both the virtual readout electrode M and the fourth node N4 are connected to the pre-amplifier 51 within the signal processing and calculating means 80 (see FIG. 8B). The second bottom electrode 13R may be connected to the first heating terminal T1 or the second heating terminal T2, or the virtual readout electrode M. In some situation, the black coating layer 16 in the left pyroelectric sensing element 10L, which has high emissivity, may also be omitted if the surface of the electrical resistance layer has emissivity high enough.

FIG. 7A is a schematic diagram of the second type of anti-microphonic sensor 100D according to this invention, which is slightly different from the sensor 100C shown in FIG. 6C. The two pyroelectric sensing elements, which are originally connected in parallel in FIG. 6C, are now connected in series. Besides, the bottom electrodes, which have the same polarity, of the two pyroelectric sensing elements are connected together. The top electrode of the right pyroelectric sensing element is connected to the signal processing and calculating means 80 by a lead wire A4(see FIG. 8B). The remaining structure is the same as that shown in FIG. 6C. The pyroelectric layers of the two pyroelectric sensing elements, which are originally separated in the sensor 100D shown in FIG. 7A, may also be integrally formed so as to obtain a varied sensor 100D' as shown in FIG. 7B.

According to this invention, due to the fact that the power supply for heating the pyroelectric sensing element is connected to one of the input terminals of the pre-amplifier 51 (see FIG. 8B), as to be explained in further detail below, if the heating power supply is not isolated from the power supply of the whole thermometer system, the problem of interference in measured pyroelectric signal from heating signal cannot be solved without using expensive responsive signal amplifier of differential type. Examples of energy stimulators acting as isolated heating power supply, hereinunder sometimes referring to as the "floating power supply", are shown in FIGS. 8A and 9.

FIG. 8A is a schematic diagram showing the construction of one type of energy stimulator adopted in this invention. FIG. 8B is a schematic diagram showing the way of connecting the anti-microphonic sensor 100C illustrated in FIG. 6C, the energy stimulator 57A illustrated in FIG. 8A, and a signal pre-amplifier 51. The energy stimulator 57A shown in FIG. 8A includes a capacitor 571 and a DPDT (double pole double throw) switch 572, which may be a MOS switch or a mechanical switch, interposed between the capacitor 571 and the energy meter 58. Under the control of signal processing and calculating means 80, the switch 572 may be changed between a first position (illustrated by solid line in FIG. 8A) and a second position (illustrated by dotted line in FIG. 8A). When in its first position, the capacitor 571 is electrically connected through the switch 572 to a power supply controlled by the signal processing and calculating means 80 so that the capacitor 571 may be charged by the power supply to an accurate voltage. As shown in FIGS. 8B and 8A, when the switch 572 is in its second position, the capacitor 571 is connected merely to the heating terminals T1, T2 of the anti-microphonic sensor 100C through the switch 572, the energy meter 58 and two lead wires A1, A2 so as to supply electrical power to the heating terminals T1, T2 of the sensor. By thus, the problem of interference in measured pyroelectric signal from heating signal can be avoided. The sensor 100C is also connected to the input end of the pre-amplifier 51 through two lead wires A3, A4.

Figure 1:
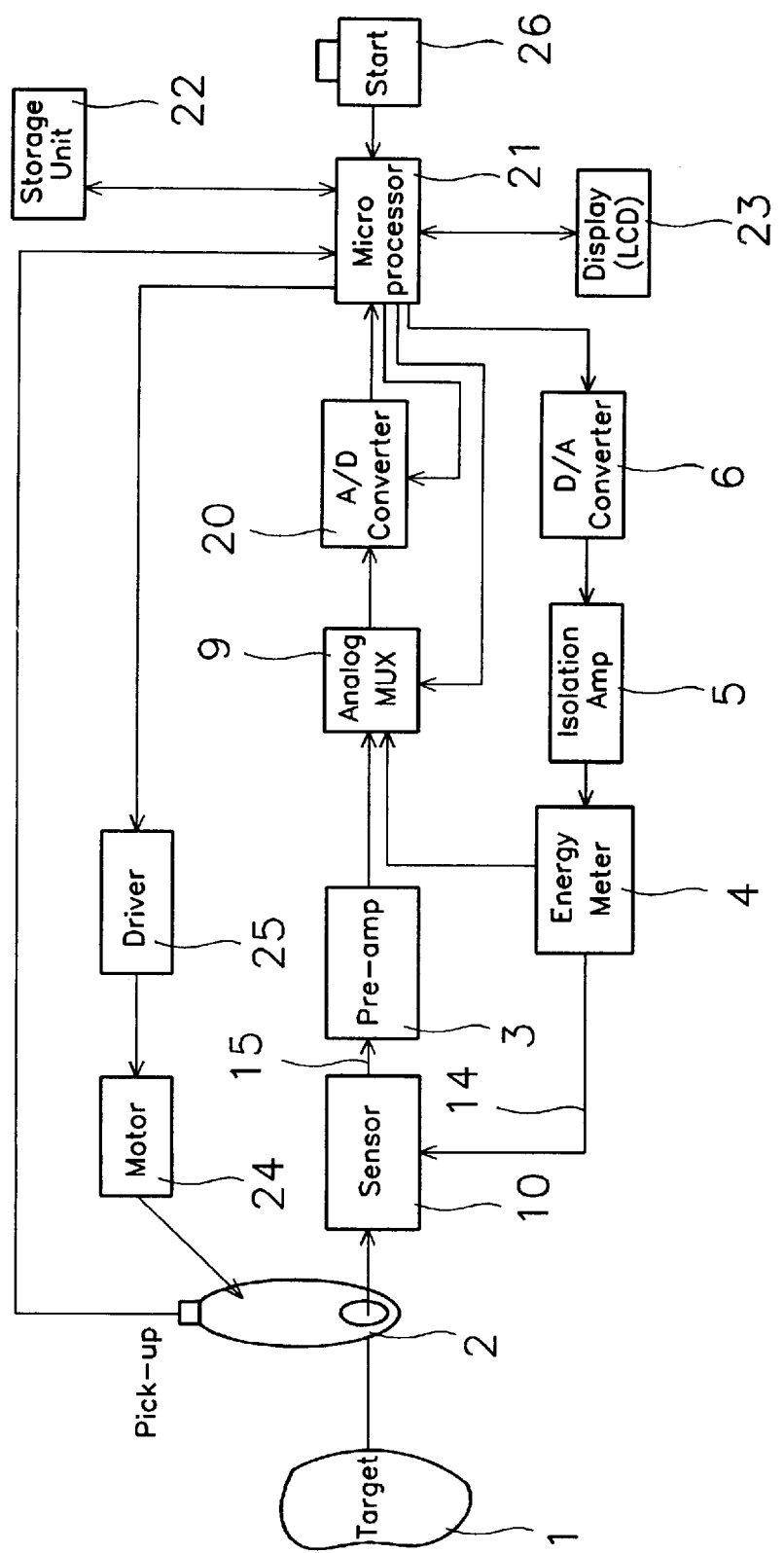
FIG. 1 is a block diagram schematically showing the structure of a prior electrically calibrated pyroelectric radiometer.
Figure 4:
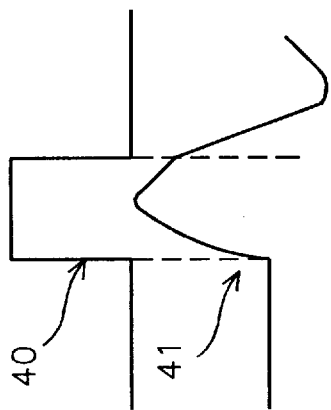
FIG. 4 illustrates an electrical calibration signal supplied to a pyroelectric sensing element during calibration operation by use of a calibration circuit shown in FIG. 3, and a responsive electrical signal generated by the pyroelectric sensing element.
Figure 3:
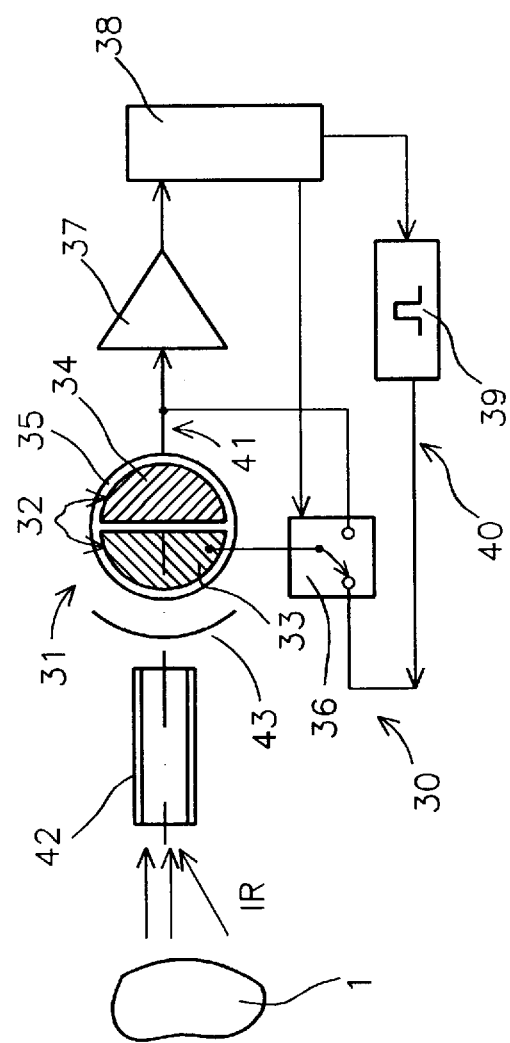
FIG. 3 is a block diagram schematically showing the structure of a calibration circuit used in another prior pyroelectric polarities.

According to this invention, electrical heating required for performing electrical calibration with respect to the pyroelectric sensor may be carried out by using the energy stimulator 57A as shown in FIGS. 8B and 8A, which has a quite simple construction including only a capacitor 571 and a DPDT switch 572, instead of utilizing the expensive isolation amplifier (see FIG. 1) as in the case of above-mentioned prior art. Besides, as compared with the electrical power (over 100 mW) consumed in temperature control operation required in prior art, such as in the afore-mentioned heating element of U.S. Pat. No. 4,797,840, the power required for electrical heating by use of the above energy stimulator 57A is under 0.1 mW which is much lower. Consequently, according to this invention, it is possible to accomplish necessary electrical calibration at high accuracy and rather low cost.

FIG. 9 is a schematic diagram showing the construction of another type of energy stimulator adopted in this invention. This type of energy stimulator 57B includes a battery 576 and a SPST (single pole single throw) switch 577. The switch 577 may be optionally closed or opened under the control of the signal processing and calculating means 80 so as to control the battery 576 to supply electric power to the heating terminals T1, T2 of the sensor or not to supply.

Figures 10A, 10B:
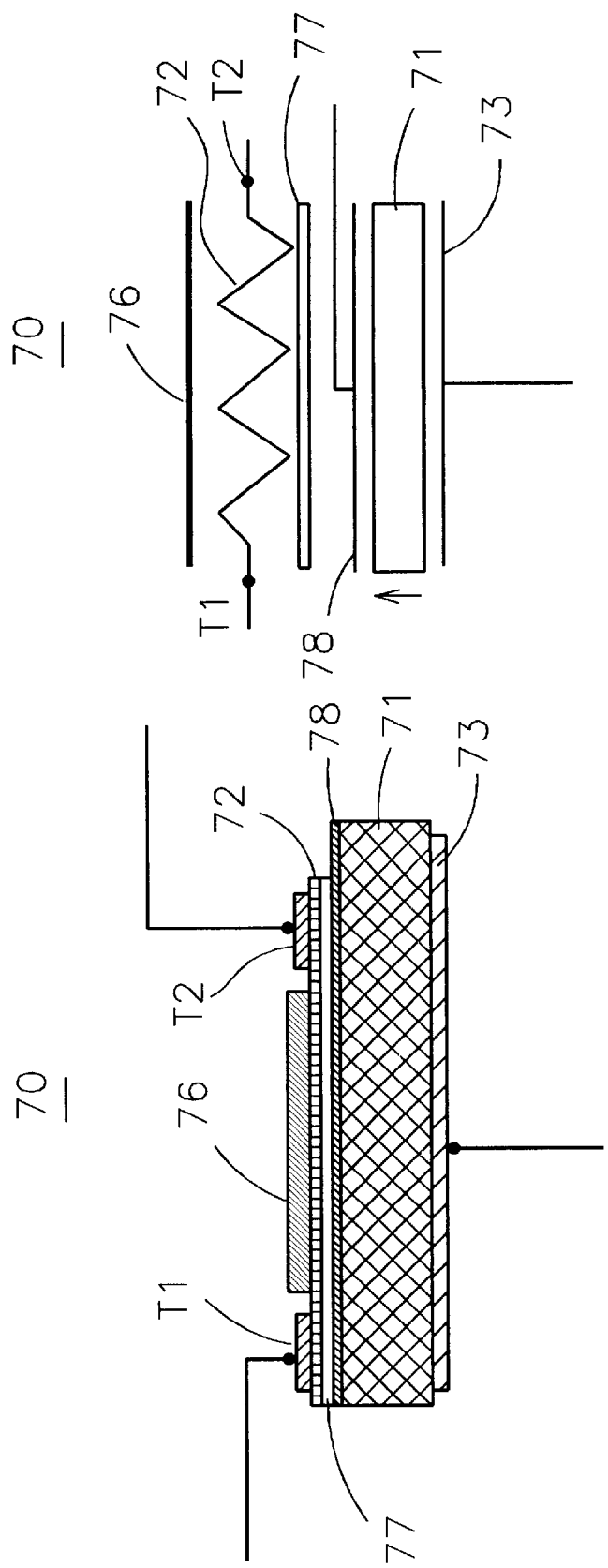
FIG. 10A is a sectional view showing the detailed construction of another type of pyroelectric sensing element adopted in this invention.
FIG. 10B is the equivalent circuit diagram of the pyroelectric sensing element shown in FIG. 10A.

Instead of the afore-described pyroelectric sensing element 10 (see FIGS. 2A and 2B), another type of pyroelectric sensing element 70 as illustrated in FIGS. 10A and 10B may also be used in the thermometer of this invention. This sensing element 70 mainly includes a pyroelectric layer 71 which generates a transient responsive charge when heated and raised in its temperature; a top electrode 78 provided on one side of the pyroelectric layer 71; a bottom electrode 73 which is provided on the other side of the pyroelectric layer 71 and is connected to an outer electric circuit (not shown in FIGS. 2A and 2B) through a lead wire so that electrical current induced in the pyroelectric layer 71 may be conducted to the outer electric circuit; an electrical resistance layer 72 provided on the one side of the top electrode 78 opposite to the pyroelectric layer 71; a first heating terminal T1 and a second heating terminal T2 provided, respectively, on the two ends of the electrical resistance layer 72; an insulator 77 sandwiched between for isolating the electrical resistance layer 72 and the top electrode 78; and a black coating layer 76 attached to the side of electrical resistance layer 72 opposite to the pyroelectric layer 71 for receiving infrared radiation coming from the target and conducting heat to the pyroelectric layer 71.

It can be found that the sensing element 70 differs from the sensing element 10 only in that the top electrode 78 and the heating layer 78 are separated and isolated by the insulator 77 so as to avoid interference of pyroelectric signal from heating signal.

Figure 11B:
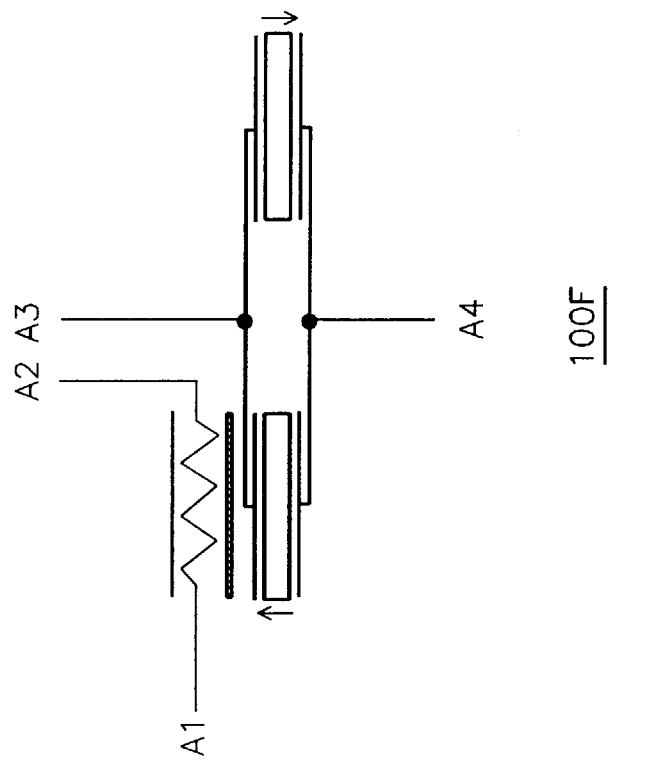
FIG. 11B is a schematic diagram of an anti-microphonic sensor obtained by simplifying the anti-microphonic sensor shown in FIG. 11A.
Figure 11A:
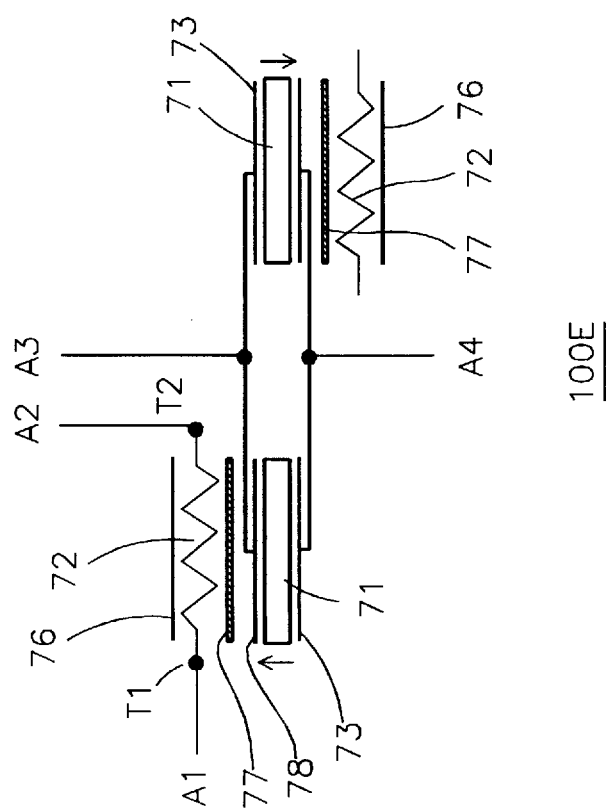
FIG. 11A is a schematic diagram of the third type of anti-microphonic sensor according to this invention utilizing the pyroelectric sensing element shown in FIGS. 10A and 10B.

As described above, in order to delete unnecessary microphonic noise, two identical sensing elements 70 as shown in FIG. 10B may be connected in parallel with the polarized orientations of their pyroelectric layers being in the opposite directions so as to cancel the microphonic noise generated in the two sensing elements. The thus obtained sensor 100E (see FIG. 11A) is the third type of anti-microphonic sensor according to this invention. In specific, the top electrode of the right sensing element and the bottom electrode of the left sensing element are connected at one node, and the top electrode of the left sensing element and the bottom electrode of the right sensing element are connected at another node. Both nodes are connected to the pre-amplifier 51 of the signal processing and calculating means 80 by the lead wires A3 and A4, respectively (see also FIG. 5B). In addition, the first heating terminal T1 and the second heating terminal T2 are connected to the energy stimulator 57 through the energy meter 58 (see also FIG. 5B) for heating the electrical resistance layer 72. Since optical heating (by infrared radiation) and electrical heating are applied only to the sensing element on the left side, the electrical resistance layer 72, the insulator 77, and the black coating layer 76 may be omitted in the right sensing element so as to obtain a sensor 100F as shown in FIG. 11B. In some situation, the black coating layer 76 in the left pyroelectric sensing element may also be omitted if the surface of the electrical resistance layer has emissivity high enough.

Figure 12:
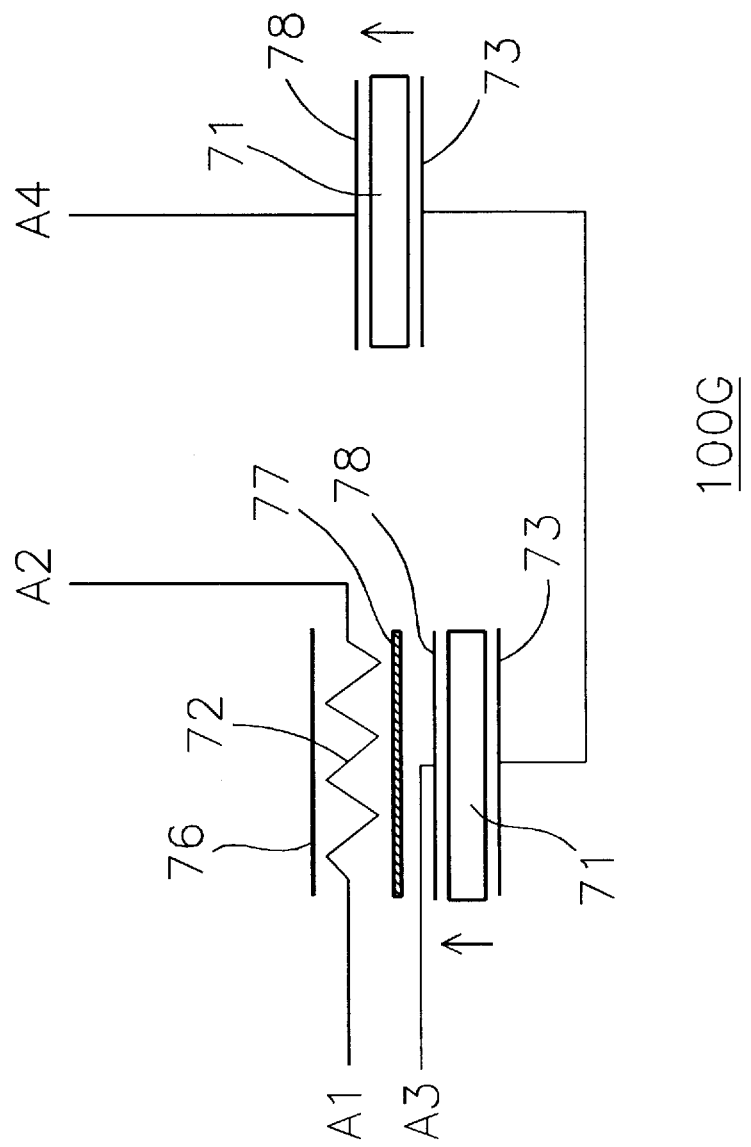
FIG. 12 is a schematic diagram of the fourth type of anti-microphonic sensor according to this invention utilizing the pyroelectric sensing element shown in FIGS. 10A and 10B.

FIG. 12 is a schematic diagram of the fourth type of anti-microphonic sensor 100G according to this invention, which is slightly different from the sensor 100F shown in FIG. 11B. The two pyroelectric sensing elements, which are originally connected in parallel in FIG. 11B, are now connected in series. Besides, the bottom electrodes, which have the same polarity, of the two pyroelectric sensing elements are connected together. The top electrodes of both the left and the right pyroelectric sensing elements are connected through the pre-amplifier 51 to the signal processing and calculating means 80 by the lead wires A3 and A4(see also FIG. 5B), respectively. The remaining structure is the same as that shown in FIG. 11B.

Now, the reason why infrared radiation (optical heating) power coming from a target and received by a pyroelectric sensor (or a pyroelectric sensing element) can be proportionally evaluated by means of electrical calibration is explained below.

Referring to FIG. 2A, optical heating and electrical heating are applied to the black coating layer 16 (76) and the electrical resistance layer 12 (72). If the thermal conductivity of the black coating layer is high enough, and the black coating layer and the electrical resistance layer are very close to each other, optical heating and electrical heating may be deemed as equivalent (hereinunder referring to as "Optical Electrical Equivalence"). Thus, $$Et/Ee=Fr*Vt/Ve$$

where,

Fr=1.00±0.02 (a constant)

Et=power for optical heating

Ee=power for electrical heating

Vt=output responsive signal from the A/D converter 53 when optical heating is applied to the sensing element (see FIG. 5A)

Ve=output responsive signal from the A/D converter 53 when electrical heating is applied to the sensing element(see FIG. 5A)

Besides, from Stefan-Boltzmann Law, we get $$Et=Kf^{**}(Tt^4-Ta^4)$$

$$Et=Ka*(Tt^4-Ta^4 \qquad (a)$$

where $$Ka = Kf^*$$
$$= 5.67*10^{-8} W/M^2/°K^4$$

Kf is an "optical coupling constant" which is determined by the optical arrangement of the thermometer system, and has a value approximately equal to:

$$As^* \sin(\theta r)^{2*}\epsilon s^* \tau s$$

where

As=radiation receiving area of the sensing element

θr=Field of View of the sensing element

εs=transmittance of window of the sensing element

τs=emissivity of the sensing element

Next, the target temperature measuring method adopted in this invention is described below.

Since the responsive signal of a pyroelectric sensing element in a sensor is proportional to the power applied thereto, it is possible to evaluate infrared radiation power emitted from a target and received by a sensing element from a known electrical power applied to the same sensing element, and then calculate the target temperature. The target temperature measuring method according to this invention mainly includes the following steps.

(1). Taking the ambient temperature Ta;

(2). Electrically heating the sensing element of the sensor by means of the energy stimulator so as to make the sensor generate a first responsive signal Ve;

(3). Measuring the electrical power supplied to the sensor and recording the result as a standard electrical power Ee;

(4). Opening the chopper so as to allow the sensor to receive infrared radiation from the target and to generate a second responsive signal Vt, and then closing the chopper;

(5). Calculating the infrared radiation Et from the target by means of the signal processing and calculating means;

Due to "Optical Electrical Equivalence", we get $$Et/Ee=Fr*Vt/Ve$$

and thus, $$Et=Ee*Fr*Vt/Ve \qquad (b)$$

(6). Calculating the target temperature Tt according to the following formulas:

$$Et=Ka*(Tt^4-Ta^4)$$

$$Tt=(Et/Ka+Ta^4)^{1/4} \qquad (c)$$

By substituting formula (b) into (c), we get $$Tt=((Ee*Fr*Vt/Ve)/Ka+Ta^4)^{1/4}$$

$$Tt=((Ee*Vt/Ve)/Kb+Ta^4)^{1/4} \qquad (d)$$

where

Kb=Ka/Fr is a constant which can be precisely determined, when manufacturing the thermometer, by a black body with a known Tt; and Ee can also be accurately measured by the energy meter.

Since both Vt and Ve are affected by the same proportion by drift in the sensitivity and thermal time constant of pyroelectric sensing element, drift in the value of a very high resistance (approximately $10^9$ ohms) which is always used together with pyroelectric sensor and is apt to fluctuate, drift of signal amplifier and A/D converter etc., and drift caused by temperature coefficient of some comprising parts of the thermometer, Vt/Ve and, thus, Tt=$((Ee*Vt/Ve)/Kb+Ta^4)^{1/4}$ remains unchanged despite of the existence of the above drift. Consequently, it is possible to obtain accurate target temperature Tt by means of the temperature measuring method of this invention as described above.

As a comparison, in the U.S. Pat. No. 4,797,840, the target temperature Tt is evaluated by the following equation:

$$Tt=(Vt/f(Ta)+Ta^4)^{1/4}$$

where Vt is influenced by the afore-mentioned drift, and even worse, f(Ta) is a function of ambient temperature Ta. Hence, the radiation thermometer according to this invention is much superior to that disclosed in the above U.S. patent in operable temperature range, long-term stability, and accuracy.

Taking into consideration the nonlinearity in the property of the sensor, and the A/D converter etc., electrical heating may be performed once more to further improve the accuracy of the temperature measuring result. Namely, after finishing the above measuring steps (1) through (6), and obtaining the optical heating power Et from formula (b), a further electrical heating with a trial power value Ee' close to the obtained optical heating power Et may be performed so as to reduce the influence of nonlinearity to minimum.

Finally, the advantages of the absolute radiation thermometer and temperature measuring method according to this invention are summarized as follows:

(1) Since optical heating power coming from the target and received by the sensor can be evaluated free from the influence of drift in the sensitivity, thermal time constant of the pyroelectric sensing element, and drift in the property of signal amplifier and A/D converter etc., target temperature can be calculated directly from the actual value of optical heating power. Hence highly accurate measuring result can be obtained.

(2) Since only one optical pulse is required per measurement of optical heating, electrical power consumption is low. Also, no continuously rotating chopper is required, the whole thermometer is simple-structured, compact, and low cost.

(3). Since optical heating and electrical heating are applied to the same component, accurate measurement result can be obtained.

(4). Since only about one second for optical heating is required for each temperature measurement, the measurement operation can be finished very promptly.

(5) Since the target temperature Tt is calculated from the ratio Vt/Ve, instead of the value Vt, the obtained temperature is immuned from the above drift.

What is claimed is:

1. An absolute radiation thermometer, comprising:

a sensor for generating a first responsive signal in response to electrical power supplied thereto by an outside power supply, and for generating a second responsive signal in response to infrared radiation coming from a target of which the temperature is to be measured;

a chopper which is interposed between the target and the sensor and which can be controlled to open or close the passage of infrared radiation from the target toward the sensor as to allow the infrared radiation to be received by the sensor only during a predetermined time period; and signal processing and calculating means for processing the first responsive signal and the second responsive signal generated by said sensor, for calculating the power of infrared radiation coming from the target and received by said sensor, based on the first and second responsive signals and then obtaining the temperature of the target according to said power of infrared radiation, wherein said sensor comprises a first pyroelectric sensing element for receiving infrared radiation coming from the target or electrical power supplied by the outside power supply, a second pyroelectric sensing element, and a variable resistor;

said first pyroelectric sensing element comprising: a first pyroelectric layer; a first electrical resistance layer provided on one side of said first pyroelectric layer; a first heating terminal provided on the first end of said first electrical resistance layer; a second heating terminal provided on the second end of said first electrical resistance layer; and a first bottom electrode provided on the other side of said first pyroelectric layer;

said second pyroelectric sensing element comprising: a second pyroelectric layer; a top electrode provided on one side of said second pyroelectric layer; and a second bottom electrode provided on the other side of said second pyroelectric layer;

said first heating terminal and said second heating terminal being connected to said energy stimulator;

said first bottom electrode and said second bottom electrode having the same polarity and being connected together; and said energy stimulator comprising an energy storage means and a switch means interconnected between said energy storage means and said sensor for optionally controlling said energy storage means to supply or not to supply electrical power to said sensor.

2. An absolute radiation thermometer as claimed in claim 1, wherein said first pyroelectric layer is integrally formed with said second pyroelectric layer.

3. An absolute radiation thermometer, comprising:

sensor for generating a first responsive signal in response to electrical power supplied thereto by an outside power supply, and for generating a second responsive signal in response to infrared radiation coming from a target of which the temperature is to be measured;

a chopper which is interposed between the target and the sensor and which can be controlled to open or close the passage of infrared radiation from the target toward the sensor as to allow the infrared radiation to be received by the sensor only during a predetermined time period; and signal processing and calculating means for processing the first responsive signal and the second responsive signal generated by said sensor, for calculating the power of infrared radiation coming from the target and received by said sensor, based on the first and second responsive signals and then obtaining the temperature of the target according to said power of infrared radiation, wherein said sensor comprises a first pyroelectric sensing element for receiving infrared radiation coming from the target or electrical power supplied by the outside power supply, a second pyroelectric sensing element, and a variable resistor;

said first pyroelectric sensing element comprising: a first pyroelectric layer; a first electrical resistance layer provided on one side of said first pyroelectric layer; a first heating terminal provided on the first end of said first electrical resistance layer; a second heating terminal provided on the second end of said first electrical resistance layer; and a first bottom electrode provided on the other side of said first pyroelectric layer;

said second pyroelectric sensing element comprising: a second pyroelectric layer; a top electrode provided on one side of said second pyroelectric layer; and a second bottom electrode provided on the other side of said second pyroelectric layer;

said first heating terminal and said second heating terminal being connected to said energy stimulator;

said first bottom electrode and said second bottom electrode having the same polarity and being connected together; and said energy stimulator comprising an energy storage means and a switch means interconnected between said energy storage means and said sensor for optionally controlling said energy storage means to supply or not to supply electrical power to said sensor;

wherein said energy storage means comprises a capacitor and said switch means comprises a DPDT (double pole double throw) switch;

said capacitor being electrically connected through said switch means to a power supply controlled by said signal processing and calculating means for being charged when said energy stimulator does not supply electrical power to said sensor; and said capacitor being electrically connected through said switch means merely to said sensor upon supplying electrical power to said sensor.

* * * * *